United States Patent [19]

Wallington

[11] Patent Number: 4,736,890

[45] Date of Patent: Apr. 12, 1988

[54] BEVERAGE GLASS SPIGOT PROTECTOR

[76] Inventor: Richard E. Wallington, 11741 Copper Pl. NE., Albuquerque, N. Mex. 87123

[21] Appl. No.: 691,656

[22] Filed: Jan. 15, 1985

[51] Int. Cl.[4] ........................ B05B 1/28; F16L 35/00; B65D 63/00

[52] U.S. Cl. .................................... 239/288; 137/378; 137/379; 24/17 AP

[58] Field of Search .................. 239/288, 288.3, 288.5, 239/602; 137/377, 378, 379, 380; 24/17 AP, 30.5 P, 16 PB

[56] References Cited

U.S. PATENT DOCUMENTS

| | | | |
|---|---|---|---|
| 814,715 | 3/1906 | Lummis et al. | 137/378 |
| 1,008,233 | 11/1911 | Zabel et al. | 137/378 |
| 1,087,403 | 2/1914 | Scott | 137/378 |
| 3,129,894 | 4/1964 | Schermerhorn | 239/602 |

FOREIGN PATENT DOCUMENTS

| | | | |
|---|---|---|---|
| 698696 | 10/1953 | United Kingdom | 24/17 AP |

*Primary Examiner*—Joseph F. Peters, Jr.
*Assistant Examiner*—Patrick N. Burkhart

[57] ABSTRACT

A resilient faucet extension functions both as a nozzle and guard attachment and is particularly well adapted for beer faucets. The nozzle design controls the angle and rate of beer delivery to a glass so as to reduce foaming, while the resilient extended portion of the attachment serves to absorb impacts between glasses, or similar items such as glass pitchers, ceramic beer steins, and the like, and a dispensing unit, such as a faucet, to thus reduce chipping and breaking of the glass items.

5 Claims, 2 Drawing Sheets

BEVERAGE GLASS SPIGOT PROTECTOR

BACKGROUND OF THE INVENTION

1. Field of the Invention

The present invention relates to faucet extensions and more particularly pertains to a combined resilient nozzle and guard for beverage spigots.

2. Description of the Prior Art

Resilient faucet extensions, such as the type adapted for use on kitchen sinks or wash bowls, are known in the art. These extensions are designed to have sufficient resiliency to permit bending in various directions so as to project water on dishes or the like which are being washed or rinsed. These resilient extensions are also normally constructed from soft rubber which then lessens the danger of glassware breakage and cracking which quite often occurs with metal faucet extensions.

A representative example of a prior art rubber faucet extension is to be found in U.S. Pat. No. 2,171,023, which issued to J. Buxton on Aug. 29, 1939. The rubber faucet extension disclosed in this patent is provided with a metal swiveling elbow retained within an interior portion of the extension so as to control the shape thereof, and the extension is further provided with tapering walls, thereby to strengthen the extension against water pressure. In effect, the Buxton reference is illustrative of on-going engineering efforts to continually improve faucet extensions whereby they function efficiently both as guards and nozzles.

A more recent attempt to improve upon faucet extensions, such as the Buxton device discussed above, is to be found in U.S. Pat. No. 3,129,894, which issued to Clarence Schermerhorn on Apr. 21, 1964. The Schermerhorn patent is directed to a combined nozzle and guard attachment for faucet spouts and contemplates a device which may be frictionally held in different positions on a faucet spout to permit substantially free or variably restrictive flow therefrom. Additionally, the attachment operates as a cushion for the spout outlet so that glassware or dinnerware coming in contact therewith will not be chipped or broken.

The Schermerhorn device is effectively a resilient conduit which may be frictionally concentrically positioned over an existing faucet. One end of the conduit is preformed into a compressed configuration whereby, depending upon the extent of faucet insertion into the conduit, the compressed end will be selectively opened. More specifically, when a faucet is positioned substantially completely throughout the axial length of the protector, a completely open orifice will be achieved. By sliding the protector downwardly off of a spigot, a more restricted orifice is realized. While the Schermerhorn spigot protector most likely operably functions in a desired manner so as to achieve its intended function, it can be appreciated that this type of spigot protector could be difficult to position over an existing nozzle and, by its design, it is limited to only standard faucet shapes, i.e., it is not particularly well suited for special applications which require novel spigot designs, such as beer faucets and the like.

Accordingly, it can be appreciated that there is a continuing need for new and improved faucet nozzles and guards which may be easily manufactured and used, and which are adaptable for unconventional spigot designs. In this respect, the present invention substantially fulfills this need.

SUMMARY OF THE INVENTION

The general purpose of the present invention, which will be described subsequently in greater detail, is to provide a new and improved beverage spigot protector which has all of the advantages of the prior art spigot protectors and none of the disadvantages. To attain this, the present invention envisions a spigot protector which is particularly designed for use on a beer faucet or the like. The protector may be formed from a resilient and shock absorbing material, such as rubber, and includes a strap member for positioning behind a faucet handle whereby the faucet protector is retained in position. The strap member may be of a continuous or separable construction and is integrally connected to a flexible conduit which is positionable over the spigot nozzle. Additionally, the strap member is an important feature of the spigot protector, inasmuch as it permits easy adjustments to be made so that the protector can be used with various nozzle designs. Further, the strap member facilitates a removal of the protector when desired for the purposes of sterilizing and cleaning the same.

The conduit portion of the invention is designed to extend beyond the conventional metallic faucet nozzle so as to serve as a guard against impacts between glassware and like items, and the faucet assembly, while the conduit may also be designed to function as a nozzle depending upon the diameter and angle of its interior orifice. In this respect, the conduit may extend angularly from the mouth of the faucet nozzle whereby a beverage being ejected through the nozzle will impact the interior surface of the conduit and flow downwardly therealong, thus to prevent undesired foaming when the beverage enters a glass.

It is therefore an object of the present invention to provide a new and improved beverage faucet protector which has all of the advantages of the prior art beverage faucet protectors and none of the disadvantages.

It is another object of the present invention to provide a new and improved beverage faucet protector which may be easily and efficiently manufactured and which may be quickly and conveniently attached to a beverage faucet.

It is a further object of the present invention to provide a new and improved beverage faucet protector which is durable and reliable under repeated use situations.

Even another object of the present invention is to provide a new and improved beverage faucet protector which is susceptible of low costs of manufacture with regard to both materials and labor, and which accordingly is then susceptible of low prices of sale to the consuming public, thereby making such construction economically available to the buying public.

Still yet another object of the present invention is to provide a new and improved beverage faucet protector which provides in the apparatuses and methods of the prior art some of the advantages thereof, while simultaneously overcoming some of the disadvantages normally associated therewith.

An even further object of the present invention is to provide a new and improved beverage faucet protector which facilitates a flow of a beverage into a container at a controlled rate.

Yet still another object of the present invention is to provide a new and improved beverage faucet protector which delivers a beverage at a precise angle into a container, thereby to control foaming.

Still even another object of the present invention is to provide a new and improved beverage faucet protector that operates to prevent chipping or breaking of glassware which strikes the associated faucet assembly.

Even yet another object of the present invention is to provide a new and improved beverage faucet protector which includes novel attachment means for permitting a quick removal of the protector for cleaning or adjustment purposes, or any other similar purpose.

Yet even another object of the present invention is to provide a new and improved beverage faucet protector which enhances the speed and efficiency at which individuals may serve a beverage from the nozzle without an accompanying worry of product waste or public safety.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DESCRIPTION OF THE PREFERRED EMBODIMENTS

Figure 1:
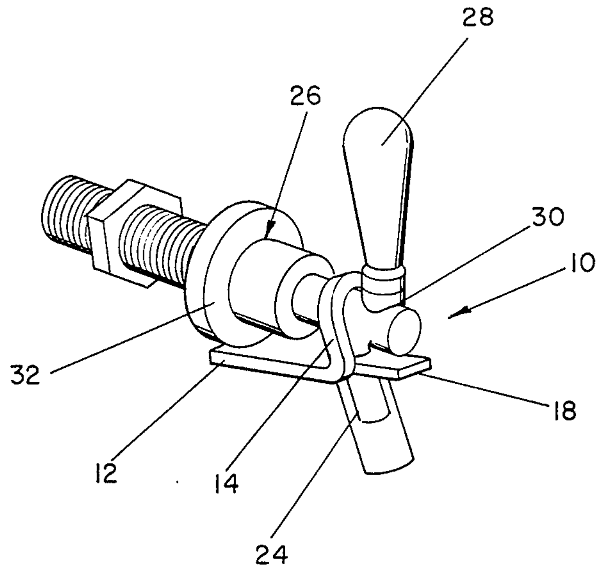
FIG. 1 is a perspective view of a first embodiment of the invention operably installed upon a beer faucet.
Figure 2:
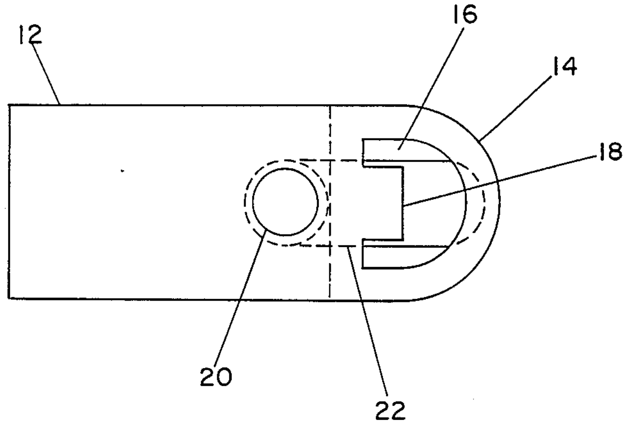
FIG. 2 is a top plan view of the first embodiment of the invention.
Figure 3:
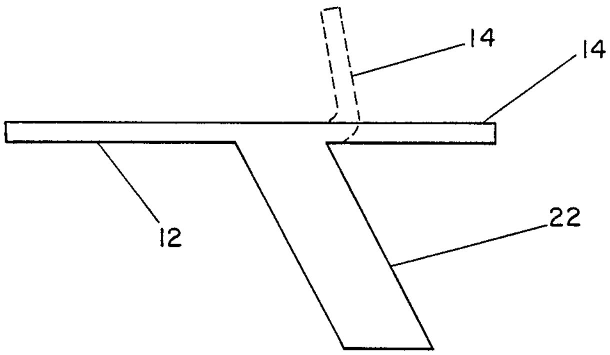
FIG. 3 is a side elevation view of the first embodiment of the invention.

With reference now to the drawings and in particular to FIGS. 1, 2 and 3 thereof, a new and improved beverage glass faucet protector embodying the principles and concepts of the present invention and generally designated by the reference numeral 10 will be described. In this regard, it can be seen that the protector 10 would normally be of an integral construction and would most desirably be formed from a resilient and flexible material, such as rubber, certain flexible plastics, or the like. More specifically, it can be seen that the protector 10 may include a flat planar body portion 12 with one end of the body portion including a continuous strap member 14. The strap member 14 is integrally or otherwise fixedly secured to the body portion 12 and lies substantially in the same plane thereof. The strap member 14 is illustrated as being of a substantially semi-circular configuration and is effectively formed by a cutout 16 directed through the body portion 12. An integral tab member 18 may be integrally formed within the cutout 16 and functions as a further protective guard in a manner yet to be described.

With further reference to FIGS. 1–3 of the drawings, it can be seen that the body portion 12 also includes an aperture 20 which effectively defines a through-extending opening in a downwardly extending conduit section 22. The conduit section 22 is integrally or otherwise fixedly secured to the body portion 12, and is of such a length as to extend beyond a nozzle 24 associated with a conventional beer faucet 26.

With respect to the manner of utilizing the first embodiment of the invention 10, it can be seen that with particular reference to FIG. 1 that the strap member 14 may be bent upwardly from the planar surface of the body portion 12, with this strap member then being positionable over a handle 28 associated with the aforementioned beer faucet 26. Once the strap member 14 has been directed downwardly to the valve body 30 as illustrated in FIG. 1, the body portion 12 may be pivoted about the beer faucet 26 in a manner which permits the conduit section 22 to be directed concentrically over the nozzle 24. When this attachment configuration is achieved, the main body portion 12 of the protector 10 will be in a substantially abutting relationship with the faucet mounting fixture 32 while the tab member 18 will extend outwardly in the illustrated manner to further function as an impact- cushioning guard. As such, when a glass is positioned beneath the nozzle 24, it can be seen that the conduit section 22 will prevent direct contact between the glass and the metallic nozzle, thereby to guard against chipping and breaking of the glass, mug, pitcher, stein, or like item, while similarly, the body portion 12 and the tab 18 further guard the glass against contact with other metallic portions of the faucet 26.

Figure 4:
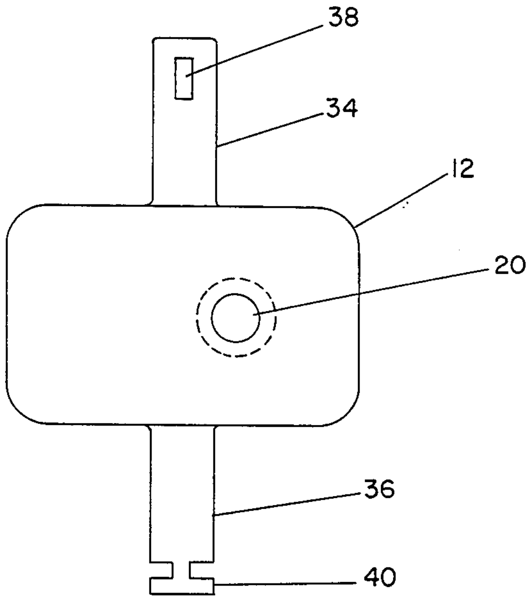
FIG. 4 is a top plan view of a second embodiment of the invention.

While FIG. 1 of the invention essentially illustrates a protector having a continuous strap member 14, FIG. 4 of the drawings illustrates a modified embodiment of the invention 10 wherein the strap member has been formed in two sections 34, 36. In this respect, section 34 may be provided with a through-extending aperture 38, while section 36 may be provided with a T-shaped connecting member 40 wherein the connecting member 40 may be inserted through the opening 38 and twisted to effectively connect the protector 10 to a faucet 26. As can be appreciated, this type of arrangement allows for an easier connection of the protector 10 to a faucet 26, especially in those instances where a faucet handle 28 is substantially enlarged in size, usually for aesthetic purposes.

Figure 5:
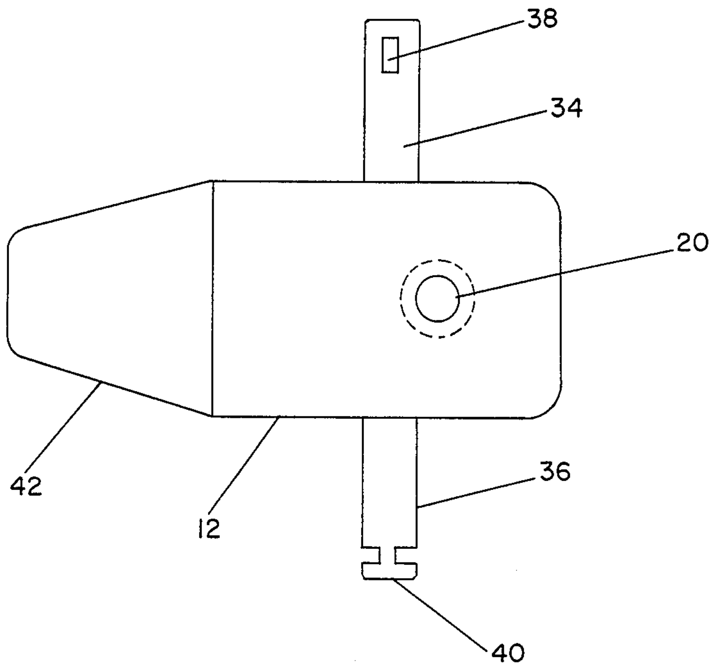
FIG. 5 is a top plan view of a third embodiment of the invention.

FIG. 5 illustrates a further modified embodiment of the invention 10 wherein this embodiment could include the use of a continuous strap 14, if desired, or may include the illustrated and aforedescribed separable straps 34, 36. Further included with this embodiment of the invention is an extended portion 42 which is designed to permit a use of the protector 10 on faucets 26 that extend substantially far outwardly from an unillustrated beverage supply container, as well as in those instances where protection is needed for larger containers, such as glass pitchers, which are susceptible to breakage from contact with faucet support portions not particularly illustrated in the drawings. In this respect, the extending portion 42 may be of a planar configuration lying in the same plane as the body portion 12 and, if desired, it may be constructed of a thinner material so as to facilitate its positioning about a faucet support member 32. In other words, the body portion 12 could be formed from a thick rubber material inasmuch as this is where glassware contact is expected, while the less likely area for glassware contact may need only be protected by the thinner portion 42.

With respect to the above-description then, it should be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. In this regard, the concept and design of the invention includes a variable diameter throat portion, as above-discussed with respect to the Schermerhorm patent incorporated herein by reference.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved beverage glass faucet protector comprising:

body means substantially positionable about a faucet body in a protective manner, said body means being substantially of a planar construction and being formed from a soft pliable material;

nozzle protection means substantially positionable over a nozzle associated with said faucet, said nozzle protection means being of a cylindrical construction and substantially completely covering said nozzle; and strap attachment means positionable about said faucet body for holding said faucet protector in an operable abutting relationship with said faucet.

wherein said strap attachment means is of a continuous construction and is positionable over a handle associated with said faucet, said strap attachment means being formed within said body means by a cutout positioned through said body means, and further including first extending tab means positioned within said cutout and being formed thereby, said first extending tab means serving to further cover and protect said faucet body.

2. The new and improved beverage glass faucet protector as defined in claim 1, and further including second extending tab means, said second extending tab means forming a part of said body means and being integrally attached thereto, said second extending tab means being of a more pliable and thinner construction than said body means.

3. The new and improved beverage glass faucet protector as defined in claim 2, wherein said second extending tab means lies in the same plane as said first extending tab means and is directed in an opposite direction therefrom.

4. The new and improved beverage glass faucet protector as defined in claim 1, wherein said nozzle protection means comprises a cylindrical conduit fixedly secured to said body means and extends outwardly from a plane defining said body means.

5. The new and improved beverage glass faucet protector as defined in claim 4, wherein said conduit is angulated with respect to said plane of said body means, thereby to selectively control a direction of flow of a beverage being emitted from said faucet nozzle and flowing therethrough.

* * * * *